United States Patent Office.

WILLIAM M. DAWSON, OF NEW YORK, N. Y.

PLASTIC COMPOUND AND PROCESS OF MAKING SAME.

SPECIFICATION forming part of Letters Patent No. 511,879, dated January 2, 1894.

Application filed October 5, 1893. Serial No. 487,208. (No specimens.)

*To all whom it may concern:*

Be it known that I, WILLIAM M. DAWSON, a citizen of the United States, residing at New York, in the county of New York and State of New York, have invented certain new and useful Improvements in Plastic Compounds and in Processes of Making the Same; and I do hereby declare the following to be a full, clear, and exact description of the invention, such as will enable others skilled in the art to which it appertains to make and use the same.

My invention relates to a new process of making a compound or composition to restrain the setting of plaster, cement and the like, and to a new composition of matter to be used in connection with plaster of paris, lime cement and other like quick-setting materials, to restrain and retard the setting of the same.

In the manufacture of my improved composition, I proceed as follows:—I take for example a quantity of stale lean meat and permit it to soak for several days in a proper quantity of water at a temperature of about 80° Fahrenheit, or in place of the lean meat, I may use glue or any other animal or vegetable organic matter, and permit it to soak, as indicated. During this period, fermentation or decomposition sets in, and when it has progressed so that the gelatinous or albuminous matters have been dissipated and the liquor is reduced to a thin watery state, it is incorporated with a mild lime, or lime partially air slaked. The incorporation of the lime and liquor has the effect of freeing the ammonia held in the liquor. This is important, because the presence of ammonia tends to destroy the restraining effect of the resultant compound, its tendency being to hasten instead of to retard the setting of the material of which it forms a part. The lime which drives off or frees the ammonia serves as a matrix or holder for the liquor and forms the body for mixing with the cement or plaster. The mass thus obtained is allowed to dry and is afterward cut or broken and reduced to a powder for convenient manipulation.

This restrainer may be used in various ways. It may be mixed either with plaster or cement in the preparation of a mortar for use in covering walls or other architectural purposes, or it may be added to plaster of paris in the kettle while the plaster is being manufactured. If thus added to the plaster it will exert the same restraining effect and other qualities in any mortar, or other material, in which such plaster may afterward be used. If intended to be mixed with plaster, other substances may be used together with this restrainer, such as sand, marble-dust, or vegetable or animal fiber, according to the exigencies of any particular occasion, and the purpose for which the compound in which this restrainer is used is intended to be employed.

The quantity of this composition to be used will depend upon the degree of restraining effect that it is desired to accomplish. If added to plaster for covering walls, it may be used with or without the admixture of any other materials, and even if in such case it be used in the proportion of only one pound of this composition to three hundred pounds of plaster, a considerable restraining effect will be had. By varying the proportions of the restrainer, the time of setting may be regulated and accurately controlled.

Having now described my invention, what I claim is—

1. The process of making a compound to restrain the setting of plaster cement and the like, which consists in mixing organic matter and water, holding the same at a temperature and for a period to produce fermentation or decomposition, mixing the resultant liquor with lime, and then drying and reducing the mass to a fine powder, as specified.

2. The herein described restraining compound, which results from the mixture of lime and a liquor obtained by the decomposition of organic matter in water, as described.

In testimony whereof I affix my signature in presence of two witnesses.

WILLIAM M. DAWSON.

Witnesses:
WM. M. STOCKBRIDGE,
THEO. L. GATCHEL.